US008354819B2

(12) United States Patent
Jung

(10) Patent No.: US 8,354,819 B2
(45) Date of Patent: Jan. 15, 2013

(54) APPARATUS AND METHOD FOR CHARGING BATTERY USING A THIN FILM PRINTED SOLAR CELL

(75) Inventor: Byeng-Sang Jung, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 568 days.

(21) Appl. No.: 12/199,995

(22) Filed: Aug. 28, 2008

(65) Prior Publication Data

US 2009/0058353 A1 Mar. 5, 2009

(30) Foreign Application Priority Data

Aug. 28, 2007 (KR) ........................ 10-2007-0086606

(51) Int. Cl.
*H02J 7/00* (2006.01)
*H01M 10/44* (2006.01)
*H01M 10/46* (2006.01)

(52) U.S. Cl. ........................................................ 320/101
(58) Field of Classification Search ................... 320/101
See application file for complete search history.

(56) References Cited

U.S. PATENT DOCUMENTS

| | | | | |
|---|---|---|---|---|
| 5,377,037 | A * | 12/1994 | Branz et al. | 359/265 |
| 2002/0159834 | A1 * | 10/2002 | Hamakawa et al. | 404/14 |
| 2007/0103762 | A1 * | 5/2007 | Chang | 359/265 |
| 2007/0222410 | A1 * | 9/2007 | Lee | 320/101 |
| 2011/0063729 | A1 * | 3/2011 | Gilbert | 359/619 |

FOREIGN PATENT DOCUMENTS

WO WO 2007085721 A1 * 8/2007

* cited by examiner

*Primary Examiner* — Arun Williams

(74) *Attorney, Agent, or Firm* — The Farrell Law Firm, P.C.

(57) ABSTRACT

A charging apparatus and method for charging a battery of a mobile terminal using a thin film printed solar cell. The apparatus has an outer case including electrochromic elements and a thin film printed solar cell. A control unit controls charging of the battery so that a color of the electrochromic elements is changed into a transparent color and sunlight is transmitted to the thin film printed solar cell disposed under the electrochromic elements. Also, the control unit controls charging of the battery such that a color of the outer case is automatically changed into a transparent color so that sunlight is transmitted to the thin film printed solar cell. Also, the color of the electrochromic elements can be changed according to the user's request so that the color of the outer case is changed into a desired color.

13 Claims, 5 Drawing Sheets

APPARATUS AND METHOD FOR CHARGING BATTERY USING A THIN FILM PRINTED SOLAR CELL

PRIORITY

This application claims the priority under 35 U.S.C. §119 (a) to an application filed in the Korean Industrial Property Office on Aug. 28, 2007 and assigned Serial No. 2007-86606, the contents of which are hereby incorporated by reference.

BACKGROUND OF THE INVENTION

1. Field of the Invention

The present invention relates generally to an apparatus and method for charging a battery of a mobile terminal using sunlight, and more particularly to an apparatus and method for charging a battery of a mobile terminal using a thin film printed solar cell.

2. Description of the Related Art

Generally, a mobile terminal, such as a mobile phone, PDA (Personal Digital Assistant), and the like, uses batteries with electric cells, which are rechargeable. The discharge rate of the battery is in proportion to the usage of the mobile terminals. When the battery is discharged, the discharged battery is either replaced with another charged battery or charged by using a wire charger or a handsfree jack.

Such a battery may be charged by using a table charger, which directly contacts power terminals of the battery for charging, or by using an adapter charger, a handsfree jack of which is connected to a handsfree port of the mobile terminal. The above mentioned table charger is uncomfortable to carry because it needs a large mobile terminal stand for mounting and supporting the mobile terminal. Therefore, the adapter charger is now widely used.

However, the adapter charger is also uncomfortable to carry because it has an adapter body incorporating a plug to be inserted into an electrical outlet, a handsfree jack to be inserted into the handsfree port of the mobile terminal, and a power cable for low voltage to connect the adapter body and the handsfree jack. Moreover, the above mentioned adapter charger is impossible to use when the user goes on a long distance business trip in a car or where there is no electrical outlet. Namely, if the battery is fully discharged on a long distance trip, where charging of the battery of the mobile terminal from an electrical outlet may not be available, the user can no longer use the mobile terminal any more.

In order to solve these problems, a two-way battery charger for a mobile terminal including a sunlight charger as shown in FIG. 1 has been developed. Referring to FIG. 1, the two-way battery charger including the sunlight charger has a plurality of light collection plates attached to an outer surface of the mobile terminal, whereby the user can conveniently charge the battery using the charger without limitation of place.

However, when charging the battery, the above mentioned two-way battery charger including the sunlight charger should be positioned such that the rear face is directed to sunlight as shown in FIG. 1, so that the front face where an LCD window is disposed on is facing down. Therefore, the user can't immediately see information displayed on the LCD while charging the battery. In addition, the charging efficiency of this charger is low because the charging of battery is done through the solar cell area 100 corresponding to the area of the battery on the rear face of the mobile terminal. In addition, there is another problem in the conventional charger of FIG. 1 in that the solar cell mounted on the surface of the mobile terminal is vulnerable to external impact, and thus may be easily broken.

SUMMARY OF THE INVENTION

Accordingly, the present invention has been designed to solve at least the above-mentioned problems occurring in the prior art, and the present invention provides an apparatus and method for charging a battery of a mobile terminal, which has a thin film printed solar cell mounted on an outer case of the mobile terminal, so that higher charging efficiency is provided while charging the battery through the thin film printed solar cell.

In addition, the present invention provides an apparatus and method for charging a battery of a mobile terminal, which can charge the battery using the thin film printed solar cell in a front or rear face of the mobile terminal without limitation of position of the mobile terminal, so that the user can readily see information displayed on an LCD, even when charging the battery.

Moreover, the present invention provides a thin film printed solar cell included in an outer case of a mobile terminal that is not easily broken by external impact.

Furthermore, the present invention provides an apparatus and method for charging a battery of a mobile terminal, which has electrochromic elements included in an outer case of the mobile terminal, so that a color of the outer case can be changed using the electrochromic elements.

In accordance with an aspect of the present invention, there is provided an apparatus for charging a battery of a mobile terminal using light energy, which includes a battery supplying the mobile terminal with electric power; a mobile phone outer case of the mobile terminal including an outer coating film disposed on a surface thereof; an electrochromic unit including electrochromic elements and a solar cell, the electrochromic unit being operative to change a color of the electrochromic elements according to applied voltages, the solar cell being operative to convert light energy into electrical energy; a charging cable connecting the mobile phone outer case and a charging circuit unit, the charging circuit unit connected with the solar cell by the charging cable, the charging circuit unit being operative to charge the battery with electrical energy input via the charging cable; and a control unit controlling, in response to a request for charging the battery, charging of the battery, such that a voltage for changing the color of the electrochromic elements into a transparent color is applied to the electrochromic unit, and electrical energy output from the solar cell is input to the charging circuit unit.

In accordance with another aspect of the present invention, there is provided a method for charging a battery of a terminal using light energy, which includes the steps of providing a mobile phone outer case and a charging circuit unit, the mobile phone outer case including an outer coating film disposed on a surface of the outer case of the terminal, an electrochromic unit including electrochromic elements and being operative to change a color of the electrochromic elements according to applied voltages, and a solar cell being operative to convert light energy into electrical energy, the charging circuit unit being connected to the solar cell through a charging cable and being operative to charge the battery with electrical energy input via the charging cable; applying a voltage for changing the color of the electrochromic into a transparent color in response to a request for charging the battery; and charging the battery by inputting electrical energy output from the solar cell to the charging circuit unit.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF THE EXEMPLARY EMBODIMENT

Hereinafter, exemplary embodiments of the present invention will be described with reference to the accompanying drawings. In the following description of the present invention, a detailed description of known functions and configurations incorporated herein will be omitted for clarity and conciseness.

Figure 1:
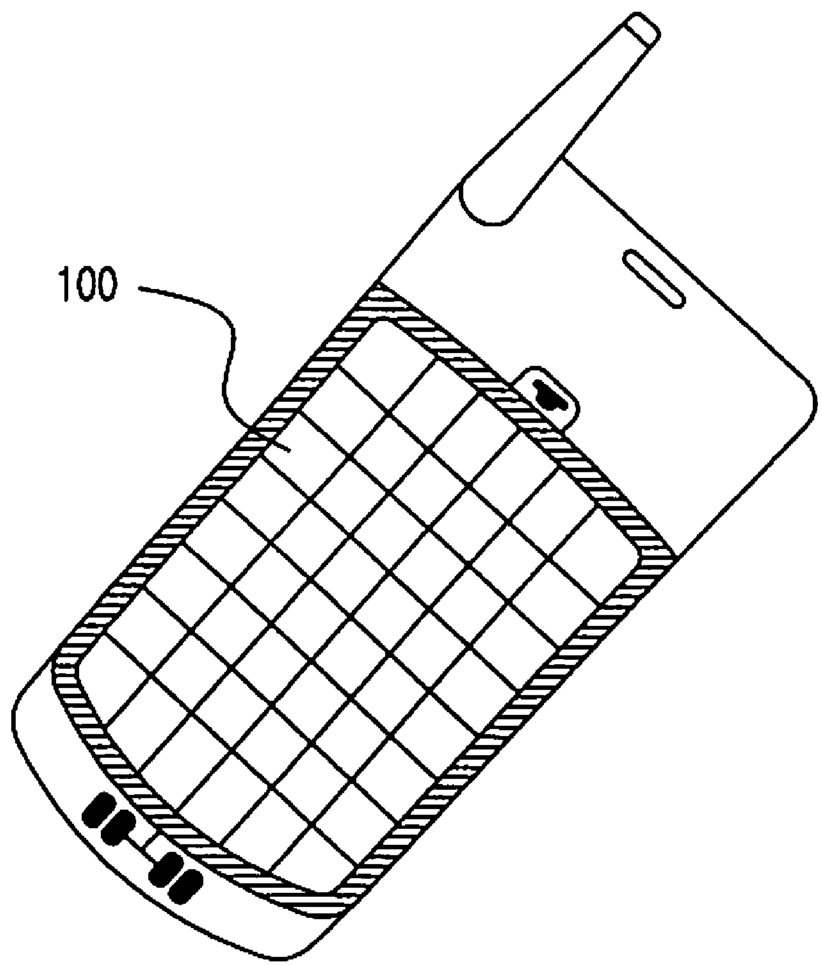
FIG. 1 is a perspective view of a conventional mobile phone, which has a two-way battery charger including a sunlight charger.
Figure 2:
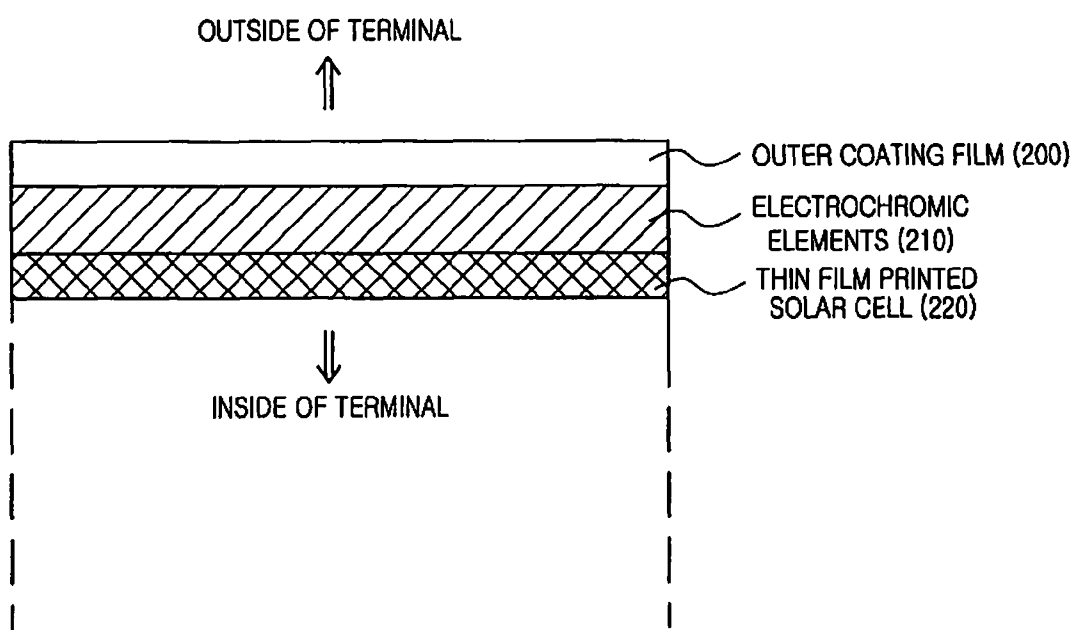
FIG. 2 is a sectional view of an outer case according to an embodiment of the present invention, which includes a thin film printed solar cell, electrochromic elements, and an outer coating film.

Referring to FIG. 2, an outer case of a mobile terminal, which includes a thin film printed solar cell, electrochromic elements, and a transparent outer coating film in accordance with an embodiment of the present invention will be described.

The outer case of the mobile terminal according to the present invention includes the thin film printed solar cell 220, the electrochromic elements 210, and the outer coating film 200 bonded together, unlike the outer case of the conventional mobile terminal formed of plastic of an opaque color. Also, when the outer case is fabricated, the solar cell 220, the electrochromic elements 210, and the outer coating film 200 are stacked sequentially outward from the inside of the terminal.

Figure 3A:
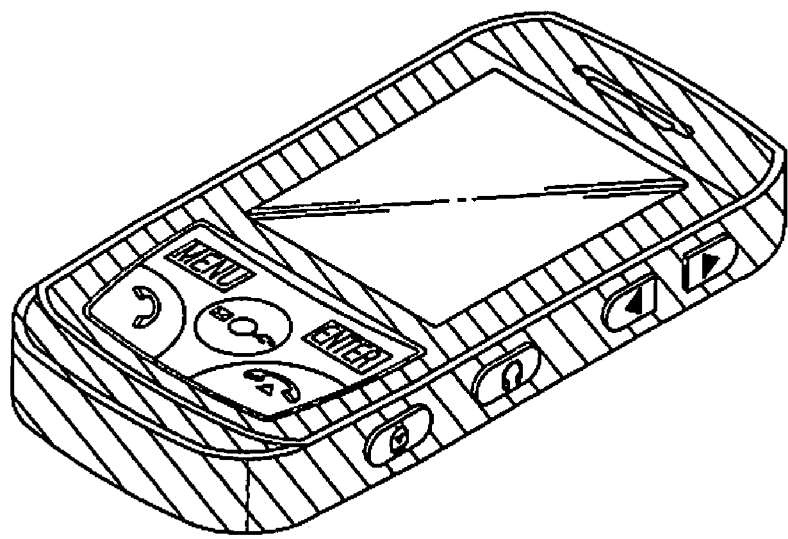
FIG. 3A is a perspective front view of a mobile terminal where an outer case of a mobile terminal according to an embodiment of the present invention.
Figure 3B:
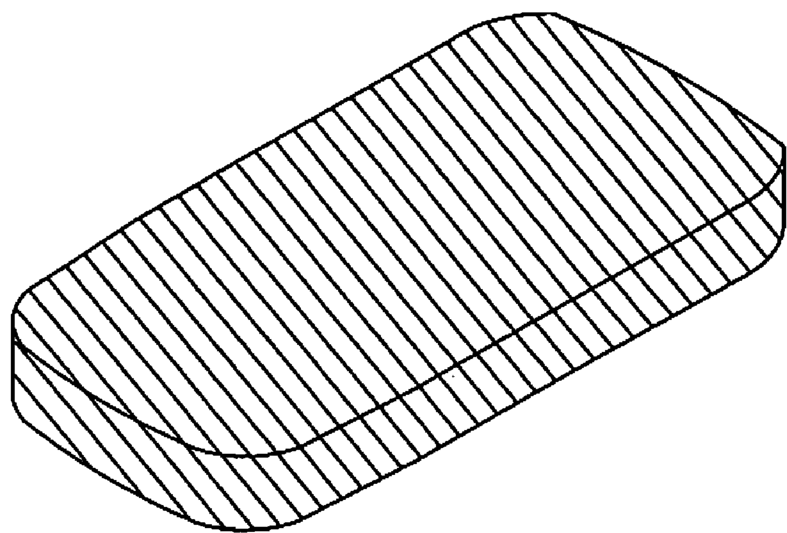
FIG. 3B is a perspective rear view of a mobile terminal where an outer case of a mobile terminal according to an embodiment of the present invention.

The thin film printed solar cell 220 according to an embodiment of the present invention, which is a solar cell for converting light energy into electrical energy, is formed such that it is in the form of a thin film and can cover the whole outer case of the mobile terminal, including curved portions and flat portions of the surface thereof, as the oblique line areas shown in FIGS. 3A and 3B.

In an embodiment of the present invention, the thin film printed solar cell is mounted onto the outer case of the mobile terminal, except a region for an LCD window, a key pad including function keys, such as a menu key, enter key, and volume key, and ports from the whole area of the outer case of the mobile terminal. The thin film printed solar cell may also be mounted even onto some portions of the region.

Therefore, when charging a battery using the thin film printed solar cell 220 according to the present invention, a wider area capable of photoelectric power generation can be provided, compared with crystalline silicon and other methods.

The electrochromic elements 210 vary in transparency and color thereof according to an applied voltage.

The outer coating film 200 is used to protect electrodes of the electrochromic elements 210. Also, the outer coating film 200 may be disposed on the outside of the terminal to protect the thin film printed solar cell 220 that is vulnerable to external impact.

During charging, the mobile terminal with the outer case as shown in FIG. 2 may change a color of the electrochromic elements 210 into a transparent color to transmit sunlight to the thin film printed solar cell 220, to convert light energy into electrical energy through the thin film printed solar cell 220, and to charge the battery via an internal charging circuit.

In addition, while not charging, in response to the user's selection to change a color of the outer case, the mobile terminal applies a voltage for changing the color of the outer case into the selected color for the electrochromic elements 210 so that the outer case has a color corresponding the applied voltage. Moreover, even when the color of the outer case has changed into the color selected by the user, sunlight may be transmitted through according to the kind of color of the outer case and the thin film printed solar cell 220 may charge the battery according to transmittance of the sunlight.

Figure 4:
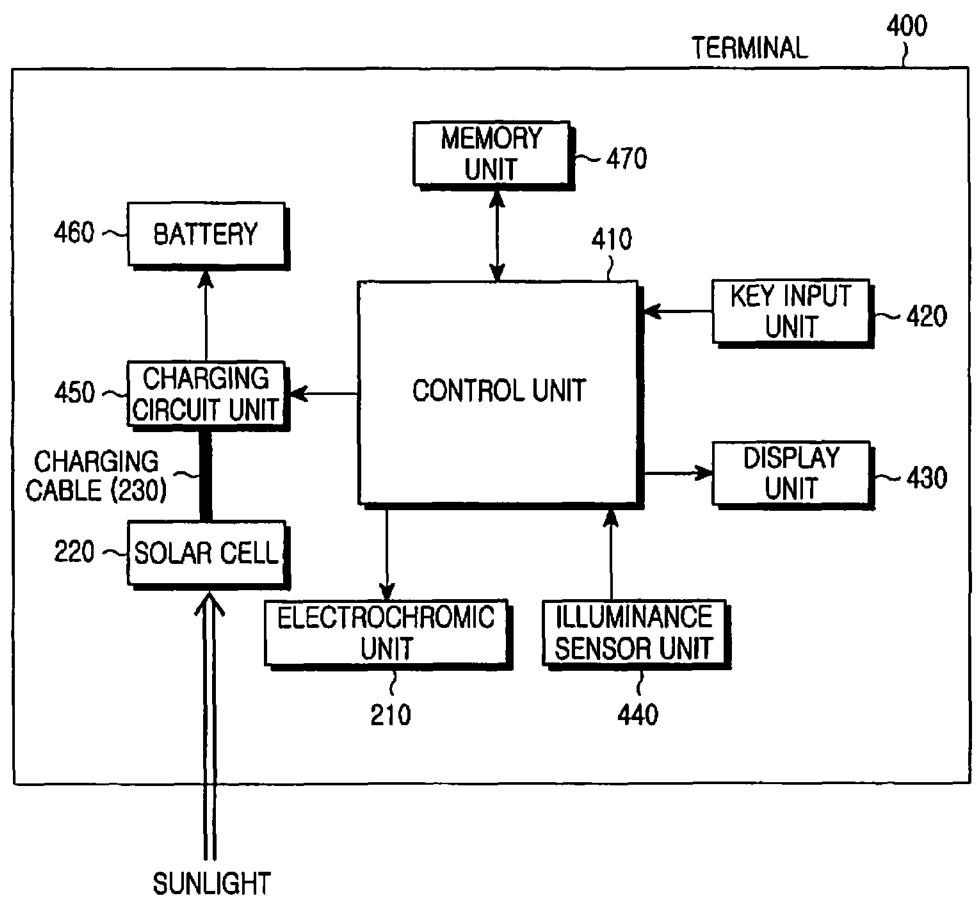
FIG. 4 is a schematic view illustrating an internal configuration of a mobile terminal, a battery of which is charged according to an embodiment of the present invention.

Hereinafter, the internal configuration of the mobile terminal with the outer case shown in FIG. 2 will be explained with reference to FIG. 4. As shown in FIG. 4, the mobile terminal 400 according to an embodiment of the present invention includes a control unit 410, a key input unit 420, a display unit 430, an illuminance sensor unit 440, the electrochromic unit 210, the solar cell 220, a charging circuit unit 450, a battery 460, and a memory unit 470.

The control unit 410 performs general control operations of the mobile terminal, such as performing a normal wireless call and data processing, and the like. Moreover, in accordance with an embodiment of the present, the control unit 410, in response to a request for charging the battery, controls charging of the battery 460, such that a voltage for changing a color of the electrochromic unit 210 into a transparent color is applied to the electrochromic unit 210, and electrical energy output from the thin film printed solar cell 220 is input to the charging circuit unit 450.

In the present invention, there are an automatic charging mode and a manual charging mode for charging the battery by using the solar cell 220.

In the manual charging mode, when there is a selection for charging the battery by using the solar cell 220, the control unit controls charging of the battery, such that a color of the electrochromic elements is changed into a transparent color so as to transmit sunlight to the solar cell 220, and the battery is charged through the internal charging circuit 450. Furthermore, when there is a request for changing a color of the electrochromic elements in the manual charging mode, the control unit performs control operations, such that the color of the electrochromic elements is changed into the requested target color, and if electrical energy is output from the solar cell 220 and transmission of sunlight is thus recognized at that time, the battery is charged with the output electrical energy through the charging circuit unit 450. Here, even though the color selected by the user of the electrochromic elements has a color and transparency to permit transmission of sunlight, and thus charging of the battery using the solar cell 220 is possible, the charging of the battery may be blocked if there is no additional selection by the user to charge the battery.

In the automatic charging mode, the control unit controls charging of the battery, such that the illuminance sensor unit 440 is actuated to measure illuminance, and if the measured illuminance is higher than a preset illuminance and an environment luminance is thus determined to be high enough to charge the battery 460, a color of the electrochromic elements is changed into a transparent color to transmit sunlight to the solar cell 220 so that the battery is charged through the charging circuit unit 450. However, if the measured illuminance is lower than the preset illuminance and an environment luminance is thus determined to be insufficient to charge the battery, the current color of the electrochromic elements is maintained. Here, the preset illuminance is configured to be a minimum luminance value to enable the battery to be charged.

Hereinafter, the control operations of the control unit 410 under the manual charging mode and the automatic charging mode will be explained.

When the manual charging mode for charging the battery using the solar cell 220 is selected and there is a request for charging the battery, the control unit 410 controls charging of the battery, in response to the request for charging the battery, such that a voltage for changing the color of the electrochromic elements into a transparent color is applied to the electrochromic unit 210, and electrical energy output from the solar cell 220 is input to the charging circuit unit 450 so as to charge the battery 460 with the electrical energy. Moreover, when there is a request for changing a color of the electrochromic elements into a predetermined color, the control unit 410 performs control operations for changing the color into the requested target color, such that a predefined voltage value corresponding to the requested target color is first checked and a voltage corresponding to the checked voltage value is applied to the electrochromic unit 210. Furthermore, when electrical energy is output from the solar cell 220, after the voltage corresponding to the checked voltage value is applied to the electrochromic unit 210, the control unit 410 controls charging of battery, such that the electrical energy output from the solar cell 220 is input to the charging circuit unit 450 so that the battery 460 is charged. Although the electrochromic elements have a color and transparency to permit transmission of sunlight and charging of the battery using the solar cell 220 is thus possible in the manual charging mode, the control unit 410 may perform a control operation, such that the charging of the battery from the solar cell 220 is blocked if there is no additional selection input for charging the battery.

When the automatic charging mode for charging the battery using the 220 is selected, the control unit 410 controls charging of the battery, such that the illuminance sensor unit 440 is actuated, and if a illuminance measured by the illuminance sensor unit 440 is higher than the preset illuminance, a voltage for changing a color of the electrochromic elements into a transparent color is applied to the electrochromic unit 210. Thereafter, the control unit 410 controls charging of the battery, such that electrical energy output from the solar cell 220 is input to the charging circuit unit 450 so that the battery 460 is charged. When the illuminance measured by the illuminance sensor is lower than the preset illuminance, the control unit 410 performs a control operation, such that a voltage corresponding to the current color of the electrochromic elements is applied to the electrochromic unit 210 so that the current color of the electrochromic elements is continuously maintained.

The key input unit 420 has a number of numeral keys and function keys and outputs input data corresponding to a key selected by the user to the control unit 410. Such a key input unit 420 may be a normal keypad key or touch screen. When the key input unit 420 is implemented as a touch screen, the user can select and input through a number of numeral keys, function keys, direction keys, and the like displayed on the touch screen by using an input tool, such as a stylus pen.

The display unit 430 receives and displays, under the control of the control unit 410, a display data for key input data input from key input unit 420 or displays operation status of the mobile terminal 400 and other information using icons and characters. Under the control of the control unit 410, the display unit 430 enables the user to visibly recognize corresponding status when the user configures or actuates needed functions. Such a display unit 430 may be implemented as a Liquid Crystal Display (LCD), Thin Film Transistor (TFT), Organic Electroluminescence (EL), and the like.

The illuminance sensor unit 440 measures illuminance and outputs the measured illuminance.

The electrochromic unit 210 includes the electrochromic elements and changes a color of the electrochromic elements according to applied voltages.

The solar cell 220 is in the form of the printed solar cell and converts light energy provided by a light source such as sunlight into electrical energy and outputs the electrical energy to the charging circuit unit 450 via a charging cable 230. The process in the solar cell 220 for converting light energy into electrical energy is omitted in this description of the present invention because it is well-known technology.

The charging circuit unit 450 charges the battery 460 with electrical energy input from the solar cell 220, in response to a charging control signal of the control unit 410.

The battery 460 supplies the terminal with electric power.

The memory unit 470 includes Read Only Memory (ROM), Random Access Memory (RAM), etc., for storing programs and information, which are needed for controlling operation controls of the mobile terminal 400. In accordance with an embodiment of the present invention, the memory unit 470 also stores the preset illuminance for the minimum luminance value to enable the battery to be charged. Further, the memory unit 470 has a plurality of colors which can appear on the outer case by the electrochromic elements and stores voltages which should be applied to the electrochromic elements for the respective colors in such a manner that the voltages correspond to the respective colors. Furthermore, transparency can be configured in a similar way as the colors. Therefore, the memory unit 470 may have a plurality of transparency values and stored voltages which should be applied to the electrochromic elements for the respective transparency values in such a manner that the voltages correspond to the respective colors.

Figure 5:
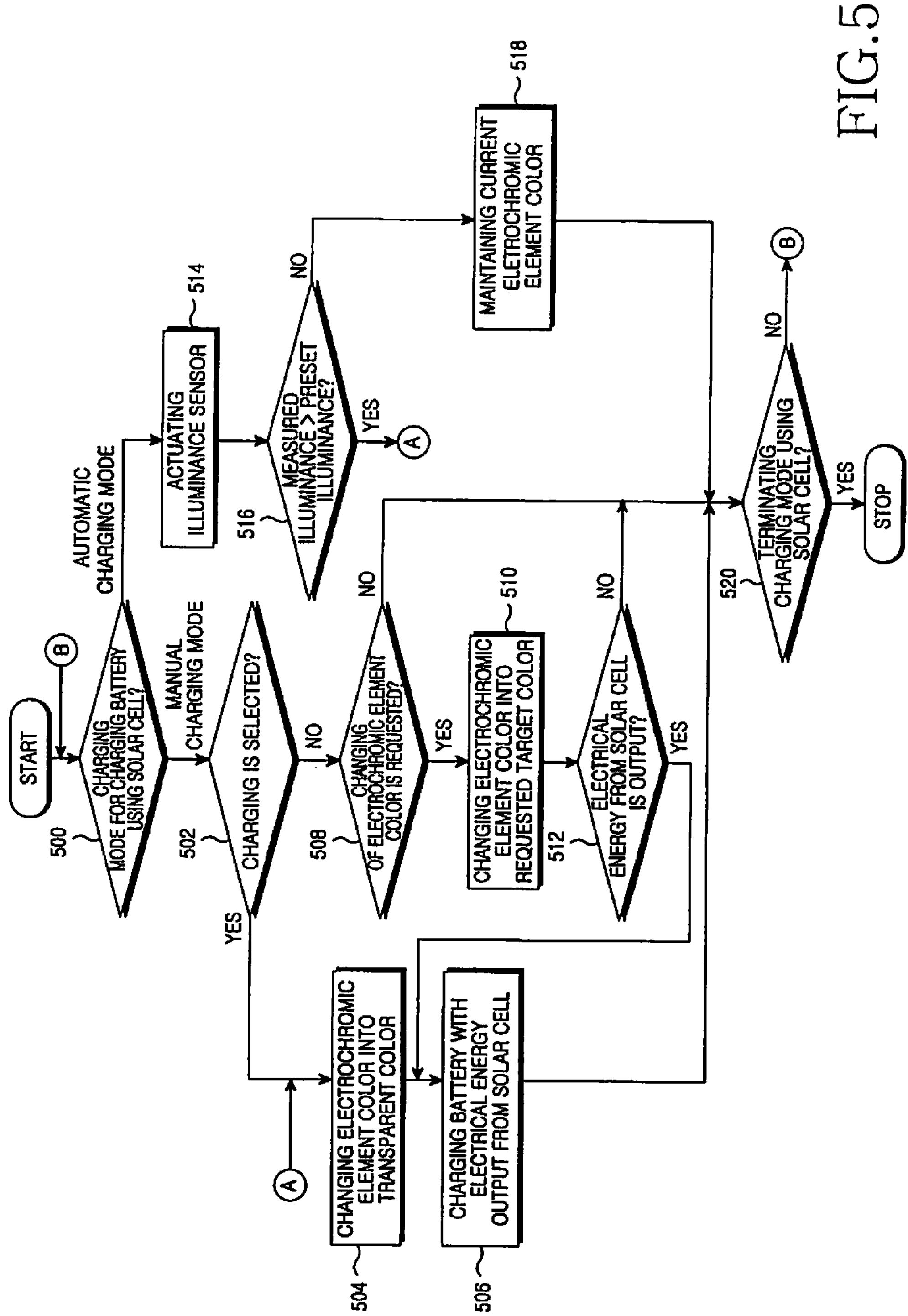
FIG. 5 is a flowchart illustrating a process for charging a battery of a mobile terminal, in accordance with an embodiment of the present invention.

Hereinafter, the process according to an embodiment of the present invention for charging the battery of the mobile terminal 400 will be explained with reference to FIG. 5.

If, at step 500, the battery charging mode is the manual charging mode for charging the battery by using the solar cell 220, the control unit 410 checks whether there is a request of the user for charging the battery at step 502, and if there is the request for charging the battery, in response to the request for charging the battery, the control unit performs a control operation, such that voltage for changing the color of the electrochromic elements into a transparent color is applied to the electrochromic unit 210 so that the color of the electrochromic elements into the transparent color at step 504. Then, the control unit 410 performs a control operation, such that electrical energy output from the solar cell 220 is input to the charging circuit unit 450 so that battery is charged.

In the checking at step 502, if there is no request for charging the battery, at step 508, the control unit 410 checks whether there is a request for changing a color of the electrochromic elements into a predetermined color. If there is the request for changing the color of the electrochromic elements, the control unit 410 checks a predetermined voltage value corresponding to a requested target color through the memory unit 470 in order to change the color of the electrochromic elements into the requested target color. Then, the control unit 410 applies a voltage corresponding to the checked voltage value to the electrochromic unit 210 so that the color of the electrochromic elements is changed into the requested target color at step 510.

At step 512, the control unit 410 checks if electrical energy is output from the solar cell 220. If electrical energy is output from the solar cell 220 at step 506, the control unit performs a control operation, such that the electrical energy output from the solar cell 220 is input to the charging circuit unit 450 so that the battery 460 is charged. However, if it is determined that there is no electrical energy output from the solar cell 220, after the color of the electrochromic elements is changed into the requested target color, the procedure goes to step 520. Here, although the electrochromic elements have a color and transparency to permit transmission of sunlight and charging of the battery using the solar cell 220 is thus possible in the manual charging mode, the control unit 410 may perform a control operation, such that the charging of the battery from the solar cell 220 is blocked if there is no additional selection input for charging the battery. As described above, if there is no additional selection for charging the battery and the charging of the battery is blocked, step 512 of FIG. 5 is omitted and the process will be preceded from step 510 to step 520.

Meanwhile, when the battery charging mode is the automatic charging mode for charging the battery by using the solar cell 220, the process is proceeded from step 500 to step 514. Then, the control unit 410 actuates the illuminance sensor unit 440 at step 514. At step 516, the control unit 410 checks whether an illuminance measured by the illuminance sensor unit 440 is greater than a preset illuminance. If the illuminance measured by the illuminance sensor unit 440 is greater than the preset illuminance, the procedure goes to (A), and at step 504, the control unit 410 applies a voltage for changing a color of the electrochromic elements to electrochromic unit 210. At step 506, the control unit 410 performs a control operation, such that electrical energy output from the solar cell 220 is input to the charging circuit unit 450 so that the battery 460 is charged.

If, in the checking of step 516, the illuminance measured by the illuminance sensor unit 440 is less than the preset illuminance, at step 518, the control unit applies a voltage corresponding to a current color of the electrochromic elements to the 210 to the electrochromic unit 210 so that the current color of the electrochromic elements is continuously maintained.

Then, the control unit 410, which has performed steps 506, 508, 512, and 518, stops the charging mode 220 if there is an input for stopping the charging mode for charging the battery using the solar cell and otherwise performs step 500.

Since the thin film printed solar cell is mounted onto the outer case of the mobile terminal, the present invention has an advantage of high charging efficiency for charging the battery by using the solar cell. Also, since the charging of the battery can be done through the thin film printed solar cell in the front or rear face of the outer case irrespective of the orientation of the mobile terminal to the light source, the user can readily check information displayed on the LCD while charging the battery. Moreover, the electrochromic elements are mounted on the thin film printed solar cell and the outer coating film is disposed on the electrochromic elements, and therefore, this structure enables the thin film printed solar cell, which is normally vulnerable to external impact to be protected and prevented from being easily broken.

In addition, the outer case of the mobile terminal according to the present invention includes the electrochromic elements, which enable the user to change the color of the outer case, thereby enabling the user to select a variety of colors of the outer case.

While the present invention has been shown and described with reference to certain preferred embodiments thereof, it will be understood by those skilled in the art that various changes in form and details may be made therein without departing from the spirit and scope of the invention. Therefore, the present invention must be defined not by the described embodiments thereof but by the appended claims and equivalents of the appended claims as set forth herein.

What is claimed is:

1. A charging apparatus using light energy for a mobile terminal, comprising:

a battery for supplying the mobile terminal with electric power;

an outer case of the mobile terminal, the outer case including an outer coating film disposed on an external surface of the outer case, a solar cell, and an electrochromic unit including a plurality of electrochromic elements, the electrochromic unit changing an element color of the electrochromic elements according to applied voltages;

a charging circuit unit for charging the battery;

a charging cable connecting the outer case and the charging circuit unit; and a control unit for controlling, in response to a request for charging the battery, charging of the battery, so that a voltage for changing the element color into a transparent color is applied to the electrochromic unit and electrical energy output from the solar cell is input to the charging circuit unit, wherein the transparent color allows transmission of sunlight to the solar cell, and wherein when electrical energy is output from the solar cell after a predefined voltage is applied to the electrochromic unit, the control unit controls charging of the battery, so that the output electrical energy is input to the charging circuit unit.

2. The charging apparatus of claim 1, wherein the solar cell comprises a thin film printed solar cell.

3. The charging apparatus of claim 1, wherein the outer coating film is coated on the electrochromic unit, and the electrochromic unit is coated on the solar cell, wherein the solar cell, the electrochromic unit, and the outer coating film are stacked sequentially outward from inside of the mobile terminal to form a layered structure.

4. The charging apparatus of claim 3, wherein the external surface includes a display region for a screen window of the mobile terminal.

5. The charging apparatus of claim 3, wherein, when there is a request for charging the battery using the solar cell, the control unit controls charging of the battery, so that a voltage for changing the element color into a transparent color is applied to the electrochromic unit and the electrical energy is input to the charging circuit unit.

6. The charging apparatus of claim 3, wherein, when there is a request for changing the element color to a requested target color, the control unit performs a control operation for changing the element color, so that the predefined voltage corresponding to the requested target color is applied to the electrochromic unit.

7. The charging apparatus of claim 1, further comprising an illuminance sensor measuring illuminance, wherein, during an automatic charging mode that automatically charges the battery using the solar cell according to environment luminance, the control unit actuates the illuminance sensor, and when a measured illuminance measured by the illuminance sensor is greater than a preset illuminance value, controls charging of the battery, so that a voltage for changing the element color into a transparent color is applied to the electrochromic unit and electrical energy output from the solar cell is input to the charging circuit unit.

8. The charging apparatus of claim 7, wherein, when the measured illuminance is less than the preset illuminance value, the control unit performs a control operation, so that a voltage corresponding to a current color of the electrochromic elements is applied to the electrochromic unit to maintain the current color.

9. A method for charging a battery of a terminal using light energy, the terminal including an outer case and a charging circuit unit, the outer case including an outer coating film disposed on an external surface of the outer case, an electrochromic unit including a plurality of electrochromic elements and changing an element color of the electrochromic elements according to applied voltages, and a solar cell, the charging circuit unit charging the battery with electrical energy output from the solar cell, the method comprising:

applying a voltage for changing the element color into a transparent color in response to a request for charging the battery;

charging the battery with the electrical energy;

checking if electrical energy is output from the solar cell after the step of applying the voltage corresponding to a checked voltage value; and charging, when the electrical energy is output from the solar cell, the battery by inputting the output electrical energy to the charging circuit unit, wherein the transparent color allows transmission of sunlight to the solar cell.

10. The method of claim 9, further comprising:

checking, prior to the step of applying the voltage, whether a charging mode of the battery is selected from one of a manual charging mode and an automatic charging mode; and checking, when the manual charging mode is selected, whether there is a request for charging the battery.

11. The method of claim 10, further comprising:

checking if there is a request for changing the element color into a requested target color;

checking, when there is the request, the voltage value predefined corresponding to the requested target color in order to change the element color into the requested target color; and changing the element color into the requested target color by applying a voltage corresponding to the checked voltage value.

12. The method of claim 10, further comprising:

measuring illuminance when the automatic charging mode is selected;

applying to the electrochromic unit, when the measured illuminance is greater than a preset illuminance value, a voltage for changing the element color into a transparent color; and charging the battery by inputting electrical energy output from the solar cell to the charging circuit unit.

13. The method of claim 12, further comprising the step of:

applying, when the measured illuminance is less than the preset illuminance value, a voltage corresponding to a current color of the electrochromic elements to the electrochromic elements so that the current color is maintained.

* * * * *